(12) United States Patent
Munechika (10) Patent No.: US 9,640,121 B2
(45) Date of Patent: May 2, 2017

(54) DRIVER IC FOR A DISPLAY PANEL WITH TOUCH DEVICE WITH DISPLAY STATE TIMING IN ACCORDANCE WITH DIFFERING DRIVING PERIODS

(71) Applicant: Synaptics Japan GK, Tokyo (JP)

(72) Inventor: Isao Munechika, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 56 days.

(21) Appl. No.: 14/194,698

(22) Filed: Mar. 1, 2014

(65) Prior Publication Data

US 2014/0253525 A1    Sep. 11, 2014

(30) Foreign Application Priority Data

Mar. 5, 2013  (JP) ................................ 2013-042749

(51) Int. Cl.
*G06F 3/041* (2006.01)
*G09G 3/36* (2006.01)

(52) U.S. Cl.
CPC ......... *G09G 3/3611* (2013.01); *G06F 3/0412* (2013.01); *G06F 3/0416* (2013.01); *G09G 3/3648* (2013.01); *G09G 2300/0413* (2013.01); *G09G 2320/0233* (2013.01)

(58) Field of Classification Search
CPC .................. G09G 2300/0413; G09G 2300/0478–2300/0495; G09G 3/36–3/3696
USPC ................... 345/87–104, 211–213
See application file for complete search history.

(56) References Cited

U.S. PATENT DOCUMENTS

| | | | | |
|---|---|---|---|---|
| 2004/0095356 A1* | 5/2004 | Inoue | ...................... | G06F 3/038 345/531 |
| 2004/0239610 A1* | 12/2004 | Ishii | ..................... | G09G 3/3611 345/100 |
| 2009/0015574 A1* | 1/2009 | Kim | ..................... | G09G 3/3688 345/208 |
| 2009/0237337 A1* | 9/2009 | Nomizo | ............... | G09G 3/2096 345/89 |
| 2010/0118013 A1* | 5/2010 | Kitayama | ............ | G09G 3/3614 345/211 |

(Continued)

FOREIGN PATENT DOCUMENTS

| | | |
|---|---|---|
| JP | 2009-294903 A | 12/2009 |
| JP | 2012-059265 A | 3/2012 |

(Continued)

OTHER PUBLICATIONS

Office Action issued Jan. 5, 2017 for related Japanese Application No. 2013-042749.

*Primary Examiner* — Sanghyuk Park
(74) *Attorney, Agent, or Firm* — Miles & Stockbridge P.C.

(57) ABSTRACT

One display frame period is divided into one or a plurality of display driving periods and non-display driving periods, and immediately before transition from the non-display driving period to the display driving period, a dummy driving period is inserted. During the dummy driving period, using dummy data changed from display data at the time of driving stop of a signal electrode during the non-display driving period, driving of the signal electrode starts. Thereafter, a display line is selected, and, using the display data corresponding to each display line selected, the signal electrode is driven.

13 Claims, 5 Drawing Sheets

(56) References Cited

U.S. PATENT DOCUMENTS

| | | | |
|---|---|---|---|
| 2010/0231551 A1* | 9/2010 | Takano | G06F 3/0412 345/174 |
| 2011/0248975 A1* | 10/2011 | Takuma | G09G 3/3225 345/207 |
| 2012/0050348 A1 | 3/2012 | Kurokawa et al. | |
| 2012/0056835 A1 | 3/2012 | Choo et al. | |
| 2012/0314518 A1* | 12/2012 | Lim | G11C 16/32 365/194 |
| 2013/0009888 A1* | 1/2013 | Park | G06F 3/041 345/173 |
| 2013/0278835 A1 | 10/2013 | Kitayama et al. | |

FOREIGN PATENT DOCUMENTS

| | | |
|---|---|---|
| JP | 2012-073599 A | 4/2012 |
| WO | 2008/152847 A1 | 12/2008 |

* cited by examiner

DRIVER IC FOR A DISPLAY PANEL WITH TOUCH DEVICE WITH DISPLAY STATE TIMING IN ACCORDANCE WITH DIFFERING DRIVING PERIODS

CROSS-REFERENCE TO RELATED APPLICATIONS

The Present application claims priority from Japanese application JP 2013-042749 filed on Mar. 5, 2013, the content of which is hereby incorporated by reference into this application.

BACKGROUND

The present invention relates to a driver IC that performs display driving and non-display driving of a display panel, and more particularly to a driving control technology performed when returning to a display from a non-display, for example, a technology which is effectively applied to the driver IC that controls driving of a liquid crystal panel in which a touch panel is incorporated in an in-cell form.

A touch panel is frequently used in a user interface of a portable information terminal such as a tablet terminal or a smartphone, and a panel module for mobile phone in the related art has mainly used an on-cell method by which a display panel and the touch panel are separately configured, but recently an in-cell method by which the display panel and the touch panel, which can be thin, are integrally configured has become popular. In particular, in the in-cell method by which the panel module can be thin, the display panel and a touch sensor share a circuit, and thus, in order to realize a great SN ratio (high sensing SN ratio) with respect to a touch detection signal, it is preferable that sensing be performed during a non-display driving period in which display driving is not performed. In view of an improvement of the sensing SN ratio, the panel module manufactured by the on-cell method is the same as that manufactured by the in-cell method, although the display panel and the touch sensor do not share the circuit, there is an influence of noise due to capacitive coupling.

In JP-A-2012-059265, it is described that a display driver which drives a liquid crystal display panel performs driving by time-dividing a display area, the display driving and touch detection performed by the touch panel can be alternately performed, and detection noise occurring when a touch detection operation is performed is reduced. That is, one frame is divided into a display mode and a touch sensing mode, and a gate driver, a data driver and a touch controller are controlled by a timing controller so as to alternately perform both modes. This system intermittently performs an image display for every several lines, and performs touch sensing during a period when an image output from the display driver is stopped, thereby realizing a high touch detection accuracy.

SUMMARY

The present inventor has reviewed that display driving and touch detection are alternately performed. According to this, a non-display driving period is generated by intermittently performing the display driving, and in a method for performing the touch detection during this period, a display driver secures the non-display driving period in one frame without a frame frequency being changed, and thus, it is necessary to operate a source electrode (signal electrode) and a gate electrode (scan electrode) of a display panel faster than a normal display timing during the non-display driving period. Then, it is found that since driving capability of a display driving period is required to be larger than the normal driving capability, thereby a difference of a load current (an output current of a driving circuit which drives a signal electrode according to a load) in the display driving and non-display driving is large, and since a display operation is intermittently performed during one frame display, the load current of the display panel is greatly changed at a boundary of display driving return, a voltage applied to the signal electrode of the display panel changes, and thereby a brightness difference occurs in the display line adjacent to the return boundary. This point will be further described with reference to the drawings not disclosed by the present inventor.

Figure 4:
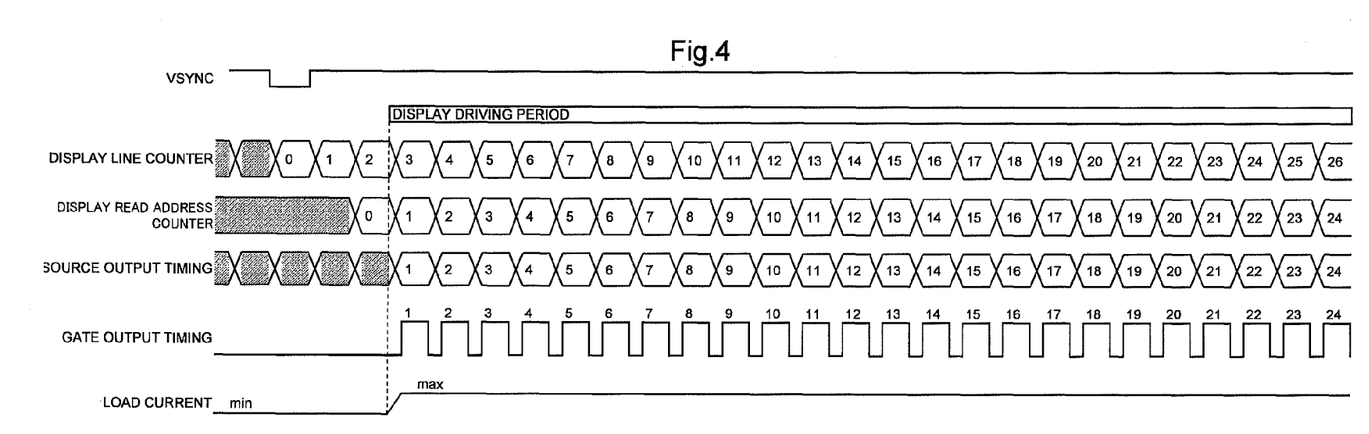
FIG. 4 is a conceptual explanatory diagram exemplarily illustrating a relationship between a panel load current and time when non-display driving is not performed.
Figure 5:
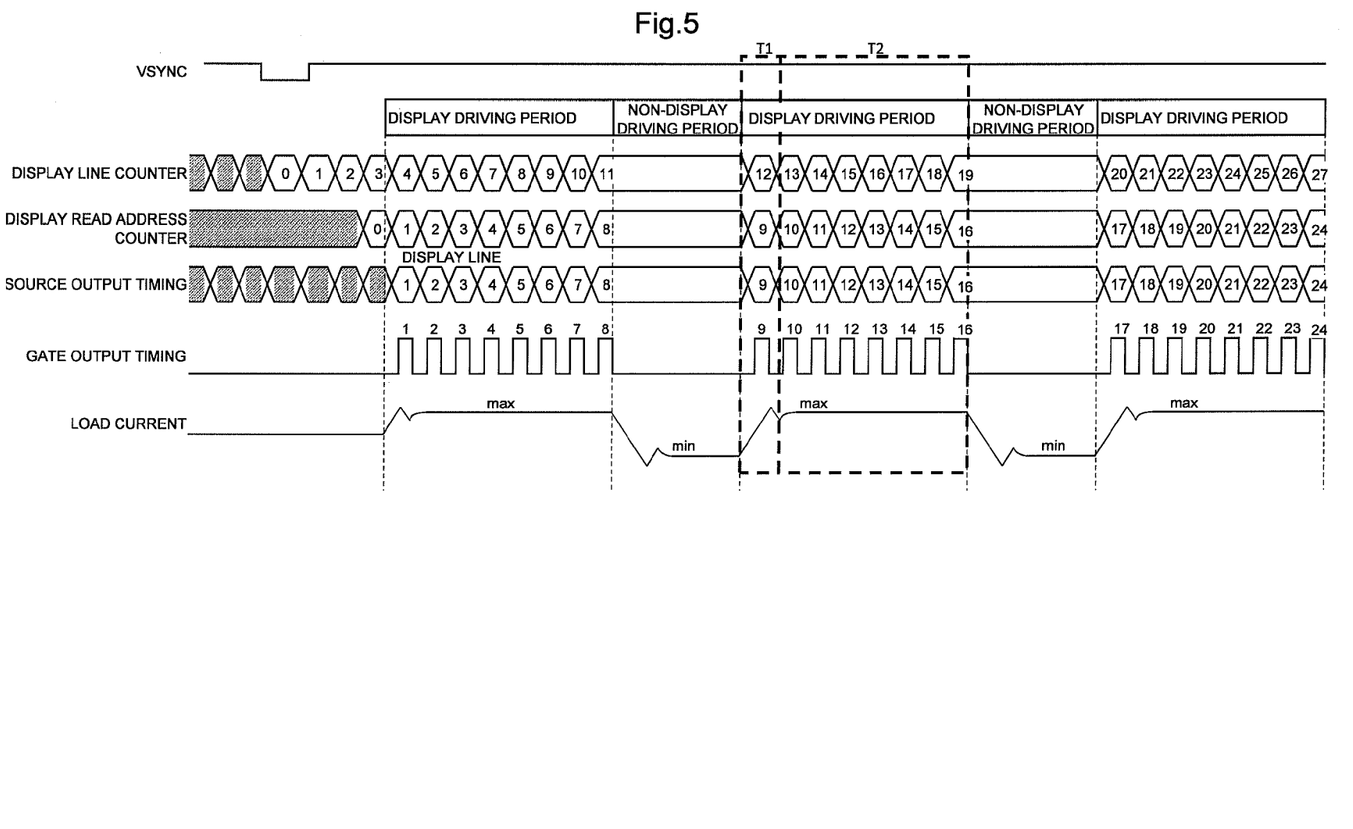
FIG. 5 is a conceptual explanatory diagram exemplarily illustrating a relationship between a panel load current and time when non-display driving is performed.

FIG. 4 exemplarily illustrates a conceptual relationship of a panel load current and time when the non-display driving is not performed, and FIG. 5 exemplarily illustrates the conceptual relationship of the panel load current and the time when the non-display driving is performed. In each figure, the same electric charges are applied to all lines for convenience, and only a portion is illustrated in an enlarged state.

In FIG. 4, since the display operation is always performed at a constant interval during the display driving period, a change of the panel load current is small during the non-display driving period, and an image quality has no problems. In contrast, in FIG. 5, at a time T1 occurring immediately after transition to the display driving from the non-display driving in which the load current is smallest, the panel load current changes greatly, a source output voltage and a gate output voltage become higher (or lower) than those at a time T2 when the display driving is continual, or a slope is steep (or gentle), and thus, an amount of integration of a voltage applied to a pixel, that is, brightness changes compared to brightness of a line at the time T2. This is the brightness difference occurring on the display line adjacent to the boundary in which the return to the display from the non-display is performed.

An object of the present invention is to reduce a brightness change of a display panel, in a case that display driving and non-display driving are alternately performed and return to the display driving from the non-display driving is performed.

The above-described object, other objects and novel features will become apparent from the description of the present specification and the accompanying drawings.

An outline of a typical one out of the embodiments disclosed in the present application, will be briefly described as follows.

That is, one display frame period is divided into one or a plurality of display driving periods and non-display driving periods. Immediately before transition from the non-display driving period to the display driving period, a dummy driving period is inserted. During the dummy driving period, using dummy data changed from display data at the time of driving stop of a signal electrode during the non-display driving period, driving of the signal electrode starts. Thereafter, a display line is selected, and, using the display data corresponding to each display line selected, the signal electrode is driven. According to this, during the dummy driving period inserted immediately before the transition from the non-display driving period to the display driving period, the signal electrode is driven by the dummy data changed from the display data at the time of the driving stop due to non-selection of the display line, and then, return to the display driving period is performed, and thus, it is possible to reduce a change peak of the load current of the display panel of a first line returning to the display from the display driving stopped for a long time.

An advantage obtained by the typical one out of the embodiments disclosed in the present application, will be briefly described as follows.

That is, it is possible to reduce a brightness change of a display panel in the case that display driving and non-display driving are alternately performed and return to the display driving from the non-display driving is performed.

DETAILED DESCRIPTION

1. Summary of the Embodiments

First, a summary with regard to the embodiments disclosed in the present application will be described. Reference symbols, which are given in parentheses in the summary description with regard to the embodiments, in the drawings exemplarily illustrate only that the reference symbols are included in conception of configuration elements to which the reference symbols are attached.

(1) <Dummy Driving Period being Inserted Immediately Before Transition from Non-Display Driving Period to Display Driving Period>

A driver IC (4) is a driver that performs a display by driving a plurality of signal electrodes (SL1 to SLj) for each display line of a display panel (2), and includes a driving circuit (20) that drives the signal electrodes, and a driving control circuit (40) that controls the driving circuit by dividing a display frame period into a display driving period (T1 to T3), a non-display driving period (T3 to T5) following the display driving period, and a dummy driving period (T5 to T7) that follows the non-display driving period and is prefixed to a next display driving period. The driving control circuit selects a display line and causes the driving circuit to drive the plurality of signal electrodes using corresponding display data for each display line selected, during the display driving period. The driving control circuit does not select the display line and causes the driving circuit to stop the driving of the signal electrodes, during the non-display driving period. The driving control circuit causes the driving circuit to start the driving of the signal electrodes using dummy data changed from the display data at the time of the driving stop of the non-display driving period, during the dummy driving period.

According to this, during the dummy driving period inserted immediately before transition from the non-display driving period to the display driving period, the signal electrodes are driven by the dummy data changed from the display data at the time of the driving stop due to non-selection of the display line, and then, return to the display driving period is performed, and thus, it is possible to reduce a change peak of a load current of the display panel of a first line returned to the display from the display driving stopped for a long time, and to reduce a brightness change of the display panel in a case that return to the display driving from the non-display driving is performed.

(2) <Using Data Corresponding to the Number of a Plurality of Display Lines for the Dummy Data>

In section (1), the driving control circuit drives the signal electrodes by the number of a plurality of display lines using other data of the number of the plurality of display lines as the dummy data during one dummy driving period.

According to this, as the dummy data, one of the display data or a specific gradation voltage may be used, and since the signal electrodes are driven by other data of the number of the plurality of display lines by the number of the plurality of display lines, it is easy to gradually change the load current of the display panel over plural times in a process performed until return to the display from the display driving stop, and it is possible to further reduce the change peak of the load current of the display panel of the first line that returns to the display from the display driving stop.

(3) <Recursively Reading Display Data at the Time of Driving Stop and Display Data Before the Driving Stop and Using Those for Dummy Data>

In section (2), the driving control circuit recursively reads the display data at the time of the driving stop during the non-display driving period and the display data before the driving stop, and uses the display data for the dummy data.

According to this, immediately before switching from the dummy driving period to the display driving period is performed, a driving state of the signal electrodes corresponds to a state at the time of the driving stop during the non-display driving period, and accordingly, it is preferable in view of a display continuity occurring when the display driving resumes.

(4) <Recursive Control of Read Address>

In section (3), the driving control circuit includes a display RAM (41) that stores display data, an address generation circuit (44) that generates a read address of the display RAM, and an address control circuit (45) that controls the generation of the read address performed by the address generation circuit. The address control circuit performs a control of updating the read address during the display driving period in synchronization with a display line cycle which is a switching cycle of the display line, and a control of updating the read address during the dummy driving period by retroactively applying the read address by the number of dummy lines on the basis of the read address which is updated during the end of the display driving period.

According to this, a function of recursively reading the retroactively applied read address on the basis of the read address of the end of the display driving period and then, updating the address which is recursively read as the read address of the dummy driving period, is added to an address control function, and accordingly, it is possible to relatively simply realize the address control function of recursively reading the display data during the dummy driving period and of setting the read display data as the dummy data.

(5) <Generating Read Address of Dummy Data Using Dummy Line Counter During Stop of Display Read Address Counter>

In section (4), the address control circuit (45) includes a line counter 401 that counts up a line count clock (LINE-CNT_EN) by a display frame unit for each display line cycle designated, a dummy line counter (411) that counts down a dummy line count clock (REWCNT_EN) from an initial value for each dummy line cycle designated, and a state control circuit (402) that controls states of the display driving period, the non-display driving period, and the dummy driving period according to the count value of the line counter. The address generation circuit includes a display read address counter (420) that counts up the line count clock. The state control circuit, generates the read address by causing the display read address counter to count up during the display driving period, stops a count operation of the display read address counter in a case that transition from the display driving period to the non-display driving period is performed, causes the dummy line counter to perform a count operation during the stop of the count operation of the display read address counter, and generates the read address of the dummy data by subtracting the count value from the count value of the display read address counter which is stopped.

According to this, the line counter, the dummy line counter, and the state control circuit are employed, and the read address of the dummy data is generated by subtracting the count value of the dummy line counter from the count value of the display read address counter which is stopped, and accordingly, namely, a relatively small circuit configuration is added, and thereby it is possible to realize the address control function of setting the recursively read display data as the dummy data.

(6) <Calculation Circuit for Generating Read Address of Dummy Data, and Address Selector>

In section (5), the address generation circuit further includes, a subtraction circuit (423) that subtracts a countdown value obtained by counting down the dummy line count clock from the initial value during the stop of the count operation of the display read address counter, from the count value of the display read address counter which is updated during the end of the display driving period, and an address selector (424) that selects the count value of the display read address counter during the display driving period, selects an output of the subtraction circuit during the dummy driving period, and then, sets the selected output as the read address.

According to this, it is possible to easily realize the address generation function of recursively reading the display data by adding the subtraction circuit and the selector to the display read address counter.

(7) <Display Line Cycle and Dummy Line Cycle which are Variable>

In section (6), there are a display line cycle counter (400) that generates the line count clock for each cycle according to a preset value, a dummy line cycle counter (410) that generates the dummy line count clock for each cycle according to the preset value, a first cycle selector (51) that, as the preset value of the display line cycle counter, selects a first preset value (RTN) which designates the display line cycle for the display driving period, or a second preset value (TS_PRD+RTN×3) which designates a display line cycle for the non-display driving period and the dummy driving period, and a second cycle selector (52) that, as the preset value of a dummy display line cycle counter, selects a third preset value (RTN) which designates a dummy display line cycle for the dummy driving period, or a fourth preset value (TS_PRD) which designates a dummy display line cycle for the non-display driving period.

According to this, on the premise that it is necessary to determine an increment cycle of the line counter in accordance with a scale (total number of display lines) of the display lines of the display panel, the read address for recursively designating the display data during the dummy driving period being generated in accordance with the scale of the display lines of the display panel becomes easy.

(8) <Cycle Selector Control Performed by State Control Circuit>

In section (7), the state control circuit performs a selection control of the first cycle selector and the second cycle selector.

According to this, the selection control of the selectors according to the display driving period, non-display driving period and the dummy driving period becomes easy.

(9) <Setting Ease of Preset Value>

In section (8), the display line cycle for the non-display driving period and dummy driving period, becomes equal to the sum of the dummy display line cycle (TS_PRD) for non-display driving period and the cycle of an integer multiple of the dummy display line cycle (RTN) for the dummy driving period, and the first preset value (RTN) and the third preset value (RTN) are the same values.

According to this, consistency of mutual preset values is maintained, and thereby it is possible to easily perform setting of the preset value.

(10) <Register Circuit of Preset Value Variability>

In section (9), there is a register circuit (60) in which the control data for determining the first preset value to the fourth preset value is rewritably set.

According to this, setting of the preset value becomes variable.

(11) <Register Circuit of Driving Period Variability of Each of Display, Non-Display, and Dummy>

In section (5), there is the register circuit (60) in which the control data for designating the display driving period, the non-display driving period and the dummy driving period using the count value of the line counter, is rewritably set.

According to this, setting of the display driving period, the non-display driving period and the dummy driving period becomes variable.

(12) <Dummy Driving Period being Inserted Immediately Before Transition from Non-Display Driving Period to Display Driving Period>

The driver IC (4) includes a display driver (10) that performs the display by driving the plurality of signal electrodes for each display line of the display panel, and a touch panel controller (11) that can perform touch detection by driving the touch panel using the display driver during the non-display driving period. The display driver includes the driving circuit (20) that drives the signal electrodes, and the driving control circuit (40) that controls the driving circuit by dividing one display frame period into the display driving period (T1 to T3), the non-display driving period (T3 to T5) following the display driving period, and the dummy driving period (T5 to T7) that follows the non-display driving period and is prefixed to the next display driving period. The driving control circuit selects the display line and causes the driving circuit to drive the plurality of signal electrodes using corresponding display data for each display line selected, during the display driving period. The driving control circuit does not select the display line and causes the driving circuit to stop the driving of the signal electrodes, during the non-display driving period. The driving control circuit causes the driving circuit to start the driving of the plurality of signal electrodes using dummy data changed from the display data at the time of the driving stop of the non-display driving period, during the dummy driving period.

According to this, in the same manner as in section (1), it is possible to reduce the brightness change of the display panel in the case that return to the display driving from the non-display driving is performed.

(13) <Recursive Control of Read Address>

In section (12), the driving control circuit includes the display RAM (41) that stores the display data, the address generation circuit (44) that generates the read address of the display RAM, and the address control circuit (45) that controls the generation of the read address performed by the address generation circuit. The address control circuit performs the control of updating the read address during the display driving period in synchronization with the display line cycle which is the switching cycle of the display line, and the control of updating the read address during the dummy driving period by recursively reading the read address updated during the end of the display driving period, and the previous read address.

According to this, a function of recursively reading the read address by the number of dummy lines on the basis of the read address of the end of the display driving period and of updating the address which is recursively read as the read address of the dummy driving period, is added to an address control function, and accordingly, it is possible to relatively simply realize the address control function of recursively reading the display data during the dummy driving period and of setting the read display data as the dummy data.

(14) <During Stop of Display Read Address Counter, Read Address of Dummy Data being Generated by Dummy Line Counter>

In section (13), the address control circuit includes the line counter (401) that counts up the line count clock (LINECNT_EN) by the display frame unit for each display line cycle designated, a dummy line counter (411) that counts down the dummy line count clock REWCNT_EN from the initial value for each dummy line cycle designated, and the state control circuit (402) that controls the states of the display driving period, the non-display driving period, and the dummy driving period according to the count value of the line counter. The address generation circuit includes the display read address counter (420) that counts up the line count clock. The state control circuit, generates the read address by causing the display read address counter to count up during the display driving period, stops the count operation of the display read address counter in the case that transition from the display driving period to the non-display driving period is performed, causes the dummy line counter to perform the count operation during the stop of the count operation of the display read address counter, and generates the read address of the dummy data by subtracting the count value from the count value of the display read address counter which is stopped.

According to this, the line counter, the dummy line counter, and the display state control circuit are employed, and the read address of the dummy data is generated by subtracting the count value of the dummy line counter from the count value of the display read address counter which is stopped, and accordingly, namely, a relatively small circuit configuration is added, and thereby it is possible to realize the address control function of setting the recursively read display data as the dummy data.

(15) <Determining Each Driving Period of Display, Non-Display and Dummy Based on Count Value of Line Counter>

In section (14), the state control circuit determines the display driving period, the non-display driving period and the dummy driving period by comparing the count value of the line counter with reference data.

According to this, it is possible to easily determine the display driving period, the non-display driving period and the dummy driving period using a reference value.

(16) <Register Circuit of Respective Driving Period Variability of Display, Non-Display, and Dummy>

In section (15), there is the register circuit (60) in which the reference data for determining the display driving period, the non-display driving period and the dummy driving period is rewritably set.

According to this, the setting of the display driving period, the non-display driving period and the dummy driving period becomes variable.

(17) <Calculation Circuit for Generating Read Address Of Dummy Data, and Address Selector>

In section (14), the address generation circuit further includes, the subtraction circuit (423) that subtracts the countdown value obtained by counting down the dummy line count clock from the initial value during the stop of the count operation of the display read address counter, from the count value of the display read address counter which is updated during the end of the display driving period, and the address selector (424) that selects the count value of the display read address counter during the display driving period, selects the output of the subtraction circuit during the dummy driving period, and then, sets the selected output as the read address.

According to this, it is possible to easily realize the address generation function of recursively reading the display data by adding the subtraction circuit and the selector to the display read address counter.

(18) <Display Line Cycle and Dummy Line Cycle which are Variable>

In section (17), There are the display line cycle counter 400 that generates the line count clock for each cycle according to the preset value, the dummy line cycle counter (410) that generates the dummy line count clock for each cycle according to the preset value, the first cycle selector (51) that, as the preset value of the display line cycle counter, selects the first preset value which designates the display line cycle for the display driving period, or the second preset value which designates the display line cycle for the non-display driving period and the dummy driving period, and the second cycle selector (52) that as the preset value of the dummy display line cycle counter, selects the third preset value which designates the dummy display line cycle for the dummy driving period, or the fourth preset value which designates the dummy display line cycle for the non-display driving period. The state control circuit performs a selection control of the first cycle selector and the second cycle selector.

According to this, on the premise that it is necessary to determine the increment cycle of the line counter in accordance with the scale (total number of display lines) of the display lines of the display panel, the read address for recursively designating the display data during the dummy driving period being generated in accordance with the scale of the display lines of the display panel becomes easy. Then, the selection control of the selector according to the display driving period, the non-display driving period and the dummy driving period becomes easy.

(19) <Setting Ease of Preset Value>

In section (18), the display line cycle for the non-display driving period and the dummy driving period, is equal to the sum of the dummy display line cycle for the non-display driving period and the cycle of the integer multiple of the dummy display line cycle for the dummy driving period, and the first preset value and the third preset value are set to the same values.

According to this, the consistency of the mutual preset values is maintained, and thereby it is possible to easily perform the setting of the preset value.

2. Further Detailed Description of the Embodiments

Embodiments will be further described in detail.

Display Device

Figure 2:
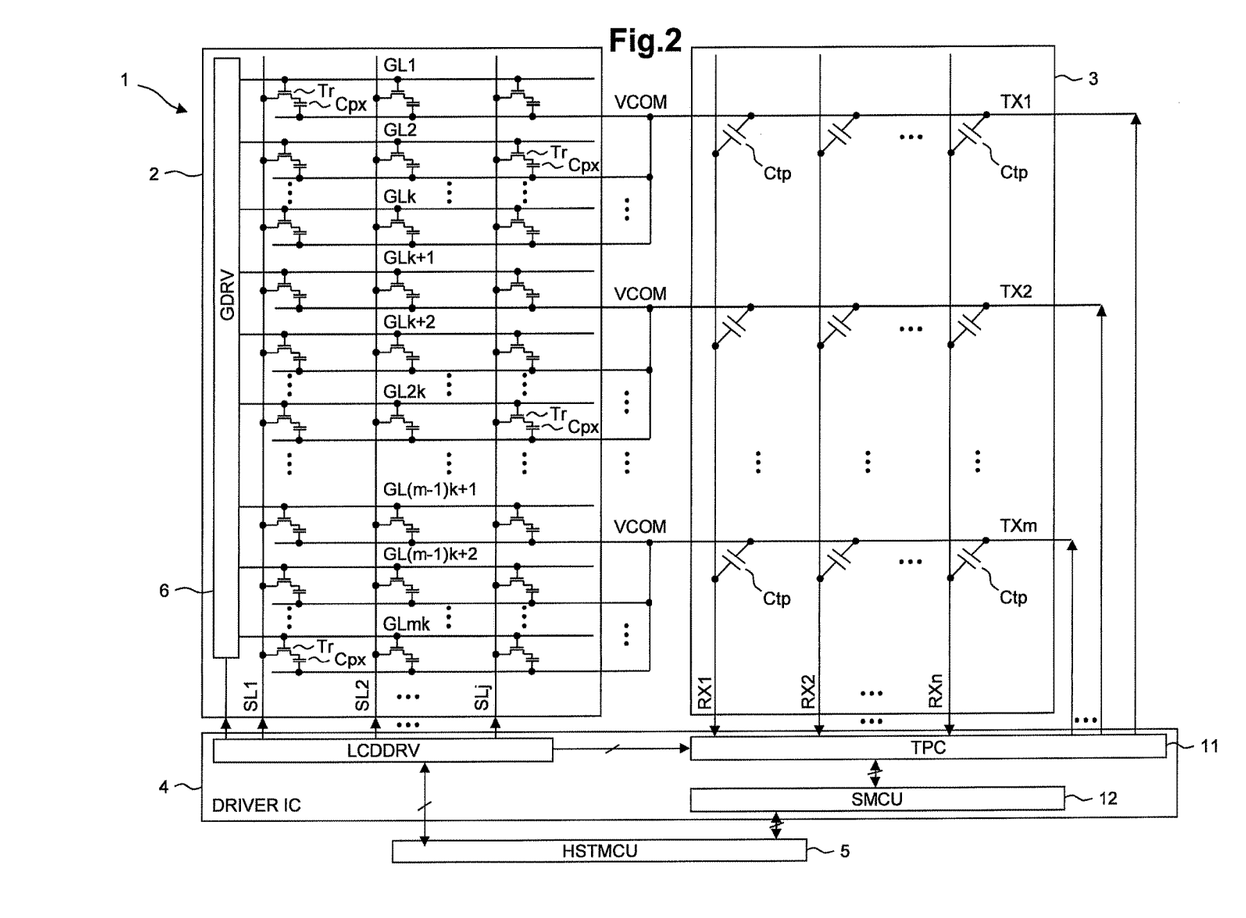
FIG. 2 exemplarily illustrates a display device that includes a driver IC which drives a panel module.

FIG. 2 exemplarily illustrates a display device that includes a driver IC 4 which drives a panel module 1. The panel module 1 is configured in a so-called in-cell form in which a touch panel 3 is embedded into a liquid crystal display panel 2 which is an example of a display panel, and for example includes a TFT array substrate in which a TFT and a pixel electrode are arranged on a glass substrate in a matrix shape, and is configured by stacking a liquid crystal layer, a common electrode layer with respect to the pixel electrode, a color filter, a touch detection capacitance, a touch detection electrode, a surface glass, and the like thereon. For convenience, FIG. 2 illustrates the liquid crystal display panel 2 and the touch panel 3 which are divided into left and right portions, but actually both are superimposed.

According to FIG. 2, for example, in the liquid crystal display panel 2, a thin film transistor Tr called TFT is arranged at each intersection of scan electrodes GL1 to GLmk (m and k are positive integers) and signal electrodes SL1 to SLj (j is a positive integer) which are arranged to intersect each other, the scan electrodes GL1 to GLmk corresponding to a gate of the thin film transistor Tr and the signal electrodes SL1 to SLj corresponding to a source of the thin film transistor Tr are installed, and then, a liquid crystal element and a storage capacitor (the liquid crystal element and the storage capacitor are denoted by one capacitor Cpx in the figure) which are a sub pixel are installed between a drain of the thin film transistor Tr and a common electrode VCOM, and thereby each pixel is formed. A line of the pixel connected to each of the scan electrodes GL1 to GLmk is referred to as the display line. In the display control, the scan electrodes GL1 to GLmk are sequentially driven, the thin film transistors Tr turn on by a scan electrode unit, and thereby a current flows between the source and the drain thereof, and at this time, each signal voltage applied to the sources through the signal electrodes SL1 to SLj is applied to the liquid crystal element Cpx, and accordingly, a state of the liquid crystal is controlled.

The touch panel 3 is formed in an electrostatic capacitance method. For example, a plurality of touch detection capacitances Ctp are formed in the matrix shape at intersections of driving electrodes TX1 to TXm and detection electrodes RX1 to RXn which are arranged to intersect each other. Although not particularly limited, in FIG. 2, the common electrodes are divided into m pieces by k display line units, in common with the driving electrodes TX1 to TXm, thereby achieving thinning of the panel module 1. When the driving electrodes TX1 to TXm are sequentially driven, potential changes occur in the detection electrodes RX1 to RXn through the touch detection capacitances Ctp, and it is possible to form a detection signal by integrating the potential changes for each of the detection electrodes RX1 to RXn. If there is a finger near the detection capacitance, a capacitance value combined with the detection capacitance Ctp is reduced by a stray capacitance, and by a difference of the detection signals according to a change of the capacitance value, touch and non-touch are distinguished. By using the touch panel 3 which is superimposed on the liquid crystal display panel 2, it is possible to discriminate a touch manipulation from a touch coordinate obtained by the touch manipulation performed on the touch panel 3 according to a screen display of the liquid crystal display panel 2.

The driver IC 4 functions as a controller device or a driver device that performs a display driving with respect to the liquid crystal display panel 2 and a touch driving detection with respect to the touch panel 3. The driver IC 4 is populated on the TFT substrate of the panel module in a form of Chip on Glass (COG) or the like. The driver IC 4 is connected to a host processor (HSTMCU) 5 of an information terminal device such as a smartphone which includes the panel module 1 as a user interface, and operation commands, display data, touch detection coordinate data and the like are input and output between the driver IC 4 and the host processor 5.

Although not particularly limited, the driver IC 4 is manufactured as a semiconductor integrated circuit by including a liquid crystal display driver (LCDDRV) 10, a touch panel controller (TPC) 11, and a sub processor (SMCU) 12. For example, the driver IC 4 which is manufactured as the semiconductor integrated circuit is formed on a semiconductor substrate such as a single crystal silicon using a CMOS integrated circuit manufacturing technology or the like. Although not particularly limited, in the example of FIG. 2, a circuit which drives the scan electrodes GL1 to GLmk is included in the liquid crystal display panel 2 as a gate driver IC (GDRV) 6. The driver IC 4 drives the signal electrodes SL1 to SLj in synchronization with a frame synchronization signal such as a vertical synchronization signal, and gives driving timing of the scan electrodes GL1 to GLmk or the like to the gate driver IC 6. The gate driver IC 6 performs driving of the scan electrodes GL1 to GLmk according to the timing received from the driver IC 4.

The liquid crystal display driver 10 controls the liquid crystal display panel 2 by dividing the one display frame period into the display driving period, the non-display driving period following the display driving period, and the dummy driving period that follows the non-display driving period and is prefixed to the next display driving period. For example, the scan electrodes GL1 to GLmk are divided into m/i blocks by (k×i) (i is positive integer) units and then, divided into m/i display driving periods, (k×i) scan electrodes of the corresponding block are sequentially driven for each display driving period divided, and the signal electrodes SL1 to SLj are driven by the display data of the corresponding display line in accordance with the driving timing of each scan electrode. The liquid crystal display driver 10 gives the gate driver IC 6 the driving timing with respect to the scan electrode of a block corresponding to the display driving period. In addition, the liquid crystal display driver 10 stops the driving of the signal electrodes SL1 to SLj during the non-display driving period, and informs the touch panel controller 11 that the touch detection operation is possible. The touch panel controller 11 forms the detection signal by sequentially driving a predetermined number of electrodes of the driving electrodes TX1 to TXm, for each non-display driving period, and by integrating the potential change occurring in the detection electrodes RX1 to RXn through the touch detection capacitances Ctp, and then, gives the obtained detection signal to the sub processor 12. The touch detection operation is not performed during the dummy driving period, and during this period, the liquid crystal display driver 10 drives in advance using dummy data the signal electrodes SL1 to SLj which are in a driving stop state, before the display is resumed during the next display period. According as the signal electrodes SL1 to SLj are driven by the dummy data before the display is resumed, it is possible to reduce the change peak of the load current of the display panel when the display is resumed, and to reduce the brightness change of the display panel in the case that return to the display driving from the non-display driving is performed. Hereinafter, the control function thereof will be described in detail.

Liquid Crystal Display Driver

Figure 1:
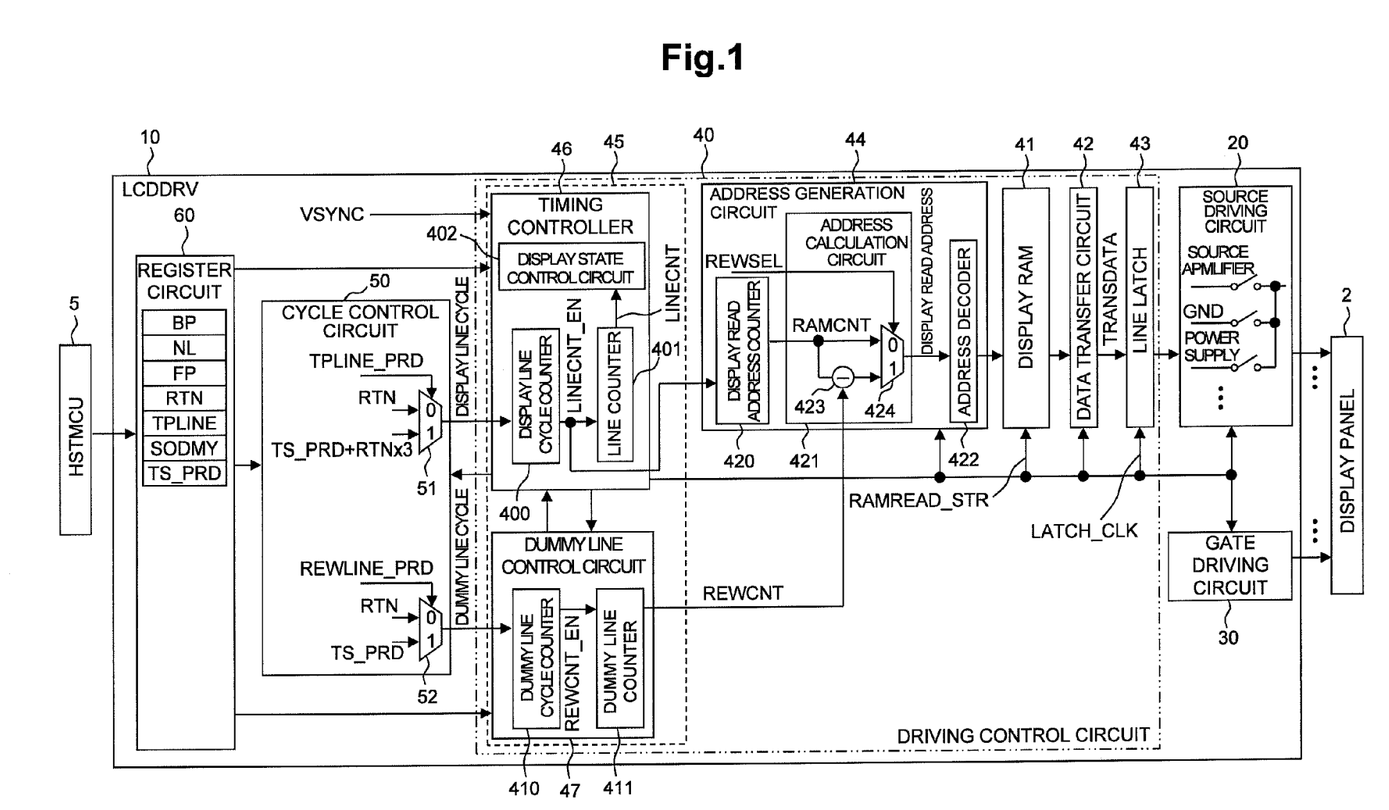
FIG. 1 illustrates an example of a display driver.
Figure 3:
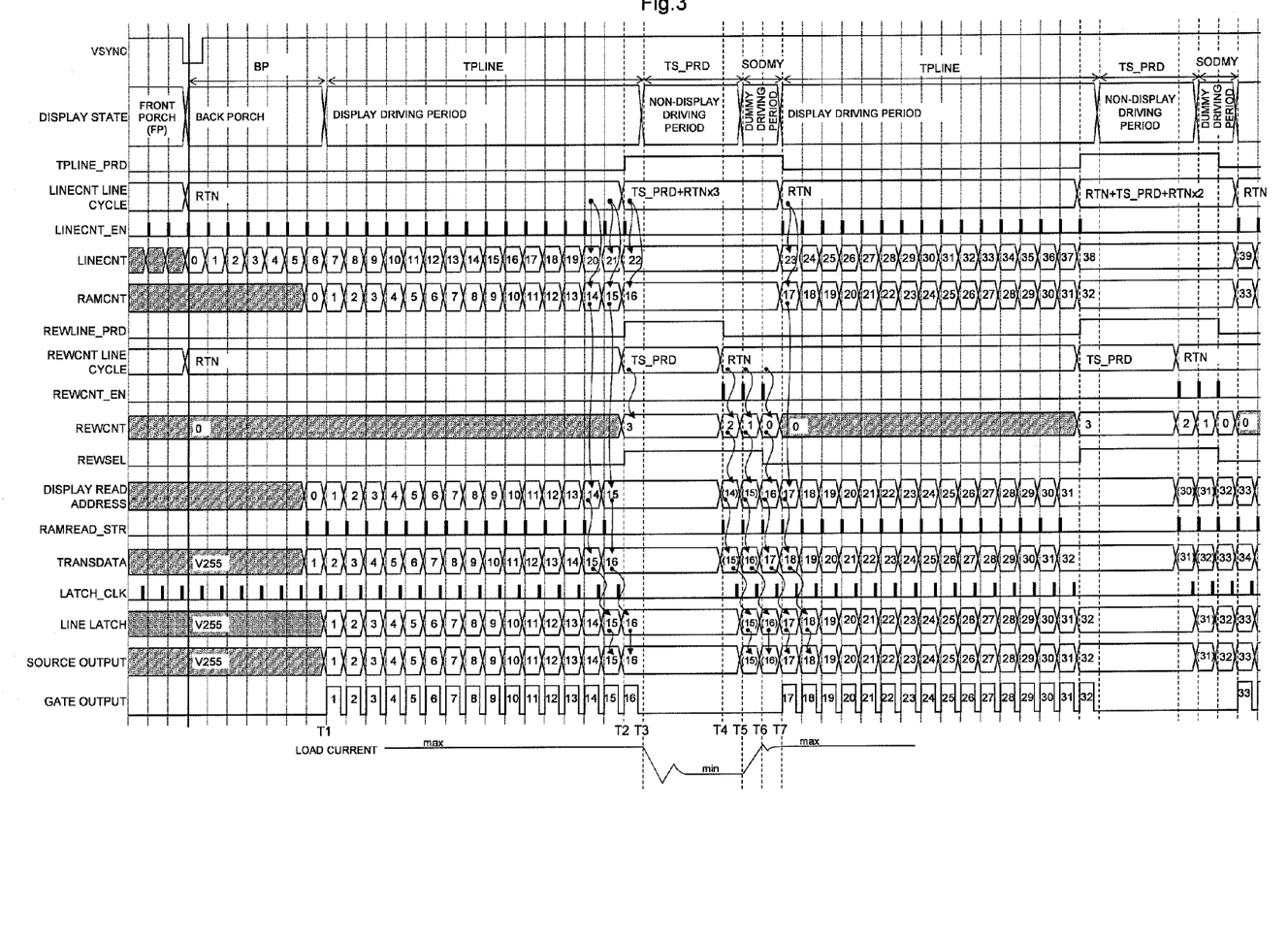
FIG. 3 is a timing chart that exemplarily illustrates operation control timing performed by the display driver in FIG. 1.

In FIG. 1, the configuration of the liquid crystal display driver 10 is exemplarily illustrated. In FIG. 3, operation control timing performed by the display driver is exemplarily illustrated. FIG. 3 illustrates values in which a count value and an address value which are represented by a count value LINECNT and a display read address, are assumed to be a digital value starting from zero. In contrast, FIG. 3 illustrates values in which numbers assigned to transfer data TRANSDATA and a gate output are assumed to be the display lines starting from one.

The display driver 10 includes a source driving circuit 20 for driving the signal electrodes SL1 to SLj, a gate driving circuit 30 that supplies the gate driver IC 6 with a gate driving timing signal or the like, a driving control circuit 40 that controls the source driving circuit 20 and the gate driving circuit 30 by dividing the one display frame period into the display driving period, the non-display driving period, and the dummy driving period, a cycle control circuit 50 and then, a register circuit 60.

The vertical synchronization signal VSYNC operating as the frame synchronization signal stipulates the period of one frame. For example, one frame is stipulated in a cycle such as 60 Hz. As illustrated in FIG. 3, the period of one frame includes a plurality of display driving periods (TPLINE), a plurality of non-display driving periods (TS_PRD), and a plurality of dummy driving periods (SODMY), except for back porch (BP) and front porch (FP). Each period is defined in the register circuit 60 by the host processor 5 by setting a line cycle of the display line to a unit. In the register circuit 60, BP denotes the number of display lines of the back porch, FP denotes the number of display lines of the front porch, RTN denotes the number of counts of the display line cycle, TPLINE denotes the number of display lines of the display driving period, TP_PRD denotes the number of display lines of the non-display driving period (touch detection period), SODMY denotes the number of display lines of the dummy driving period, and NL denotes the number of total display lines of the liquid crystal display panel 2, and each is variably defined.

The cycle control circuit 50 includes a selector 51 of the display line cycle and a selector 52 of the dummy line cycle. The selector 51 selects for example a value of RTN or TS_PRD+RTN×3 according to a logic value of a control signal TPLINE_PRD, and the selected value becomes the display line cycle. An initial value of the control signal TPLINE_PRD is a logic value "0", and according to this, the value RTN is initially selected. The selector 52 selects for example a value of RTN or TS_PRD according to a logic value of a control signal REWLINE_PRD, and the selected value becomes the dummy line cycle. An initial value of the control signal REWLINE_PRD is a logic value "0", and according to this, the value RTN is initially selected.

The driving control circuit 40 includes the display RAM 41 that stores the display data, a data transfer circuit 42 that performs an internal transfer of the display data read from the display RAM 41 to the rear stage by a driving unit such as the display line unit, a line latch 43 that latches the display data of a driving unit transferred from the data transfer circuit and gives the display data to the source driving circuit 20, the address generation circuit 44 that generates the read address of the display RAM, and the address control circuit 45 that controls the generation of the read address performed by the address generation circuit 44. For example, the address control circuit 45 includes a timing controller 46 and a dummy line control circuit 47.

The timing controller 46 includes the display line cycle counter 400, the line counter 401 and a state control circuit 402 (which is referred to as a display state control circuit 402 as follows). The display line cycle counter 400 performs a pulse change of the line count clock LINECNT_EN, after the display line cycle selected by the selector 51 is preset, whenever wraparound count is performed for a reference clock signal (not illustrated) until the preset value. According as the line counter 401 counts the pulse, the display state control circuit 402 can grasp the present process timing (process time) in one display frame as a display line number using the line count value LINECNT. Based on the BP, the FP, the TPLINE, the TS_PRD, the SODMY and the NL which are set in the register circuit 60 and the line count value LINECNT of the line counter 401, the display state control circuit 402 controls an internal operation by generating the control signal according to each of the display driving period, the non-display driving period, the dummy driving period and the like. Here, representatively, the control signals TPLIINE_PRD, REWLINE_PRD, REW-SEL, a read start signal RAMREAD_STR of the display RAM 41, and a latch clock LATCH_CLK of the line latch 43 are illustrated.

The dummy line control circuit 47 includes the dummy line cycle counter 410 and the dummy line counter 411. After the dummy line cycle selected by the selector 52 is preset, whenever the reference clock signal (not illustrated) is counted by wraparounds until the preset value, the dummy line cycle counter 410 performs a pulse change of the dummy line count clock REWCNT_EN. The dummy line counter 411 counts down the pulse from the initial value (for example, 3), thereby generating the dummy line count value REWCNT.

Although not particularly limited, as illustrated in FIG. 3, the control signal TPLINE_PRD is inverted to a logic value "1" at the time (time T2) when the value LINECNT of the line counter 401 that counts the LINECNT_EN which changes with a cycle RTN, arrives at BP+TPLINE, and thereafter, inverted to the logic value "0" at the time when the value LINECNT of the line counter 401 that counts the LINECNT_EN which changes with a cycle TS_PRD+RTN×3 increases by +1. In addition, as exemplarily illustrated in FIG. 3, the REWLINE_PRD is inverted to a logic value "1" at the time (time T2) when the value LINECNT of the line counter 401 that counts the LINECNT_EN which changes with a cycle RTN, arrives at BP+TPLINE, the dummy line counter 411 according to that is preset to an initial value 3, and the dummy line cycle counter 410 generates (time T4) pulse of REWCNT_EN with the cycle TS_PRD elapse. At this time, the REWLINE_PRD is inverted to the logic value "0", and this time, the count value REWCNT of the dummy line counter 411 is counted down from the initial value 3 in synchronization with a change of the REWCNT_EN in which a pulse change is performed with the cycle RTN. The countdown operation is ended when the TPLINE_PRD is inverted to the logic value "0".

The address generation circuit 44 includes a display read address counter 420 that counts up the line count clock LINECNT_EN, an address calculation circuit 421, and an address decoder 422. The address calculation circuit 421 includes the subtraction circuit 423 and the selector 424, selects a count value RAMCNT of the display read address counter 420 according to the logic value "0" of the control signal REWSEL, and selects the value obtained by subtracting the down count value REWCNT of the dummy line counter 411 from the count value RAMCNT of the display read address counter 420 using the subtraction circuit 423, according to the logic value of the control signal REWSEL. The value selected by the selector 424 becomes the display read address, the display read address is decoded by the address decoder 422, and thereby the display data is read from the display RAM 41 according to a decoding signal decoded by the address decoder. The subtraction circuit 423 subtracts the down count value REWCNT obtained by counting down from the initial value (value 3 in the example of FIG. 3) according to the dummy line count clock REWCNT_EN during the stop of the count operation (time T2 to T7) of the display read address counter 420, from the count value (value 16 in the example of FIG. 3) of the display read address counter 420 which is updated during the end of the display driving period. The selector 424 selects the count value of the display read address counter 420 during the display driving period, and selects an output of the subtraction circuit 423 during the dummy driving period, thereby setting the selected output as the read address. Here, the output of the subtraction circuit 423 selected by the selector 424 becomes an example of the dummy data.

In FIG. 3, for example, the display driving period is defined by the period of T1 to T3, the non-display driving period is defined by the period of T3 to T5, and the dummy driving period is defined by the period of T5 to T7. A basic internal timing obtained by the display state control circuit 402 is represented as follows.

one display line cycle=reference clock cycle×$RTN$ the number of non-display driving period in one frame=$NL/TPLINE$ the number of dummy driving period in one frame= $(NL/TPLINE)\times SODMY$ one frame cycle=reference clock cycle×$RTN$×{$FP$+ $NL$+$BP$+$(NL/TPLINE)\times SODMY$}+$TS\_PRD$× $(NL/TPLINE)$ The cycle control circuit 50 changes the line cycle of the LINECNT from RTN to TS_PRD×RTN×(SODMY+1) during the period of the time T2 to the time T7, and sets the cycle of the count value REWCNT of the dummy line counter 411 to TS_PRD during the period of T2 to T4, thereby generating the dummy display line address necessary for the non-display driving period and the dummy driving period.

The number of dummy lines is changed by the SODMY during the period of T5 to T7, and the SODMY is set to "2" when the dummy driving exemplarily illustrated in FIG. 3 is set to two lines, for example. It is necessary for the REWCNT to be changed by the number of dummy lines, and accordingly, the preset value of the REWCNT which is set at T2 becomes SODMY+1. SODMY is also varied by the REWSEL, and as an example, when REWCNT>0, becoming the logic value "1" may be performed. The number of the dummy lines is equivalent to the number of times of driving which performs the dummy driving performed by the dummy data in the dummy line cycle, and here, the dummy line cycle is the same as the display line cycle stipulated by the RTN.

The increment operation of the RAMCNT performed by the display read address counter 420 is stopped by the display state control circuit 402 during the period of T3 to T7. During the period of the time T2 to the time T6 when the control signal REWSEL output from the display state control circuit 402 is enabled (logic value "1"), the display read address becomes RAMCNT-3 during the period of T2 to T4, the display read address becomes RAMCNT-2 during the period of T4 to T5, the display read address becomes RAMCNT-1 during the period of T5 to T6, and the display read address becomes RAMCNT-0 during the period of T6 to T7.

The line latch 43 maintains the display data with one to a number of display lines. In FIG. 3, a latch operation of new display data performed by the line latch 43 is stopped during the period of the time T3 to the time T5 of the non-display driving period, and the display data recursively obtained from the display RAM 41 by the control signal LATCH_CLK generated by the display state control circuit 402 during the period of the time T5 to the time T7 of the dummy driving period, is latched.

The source driving circuit 20 receives the display data from the line latch 43, and drives in parallel each signal electrodes SL1 to SLj according to the data value thereof. In the non-display driving period of T3 to T5, the operations of the signal electrodes SL1 to SLj are stopped. During the driving stop, the output of the source driving circuit 20 is maintained by the display line data (display data of display line of No. 16) at the time of stop, or becomes a ground level or an internal supply voltage level. In the dummy driving period of T5 to T7, the source driving circuit 20 drives the signal electrodes SL1 to SLj using the display data recursively obtained as the dummy data. In the example of FIG. 3, the display line data during the end of the display driving period of T2 is the display line data of the display line of No. 16, and during the dummy driving period of T5 to T7, dummy driving is performed by the display line data of the display line of No. 15 at first, and during the end of the dummy driving period, dummy driving is performed by the display line data of the display line of No. 16 in the same manner as during the end of the display driving period. In this way, immediately before being switched from the dummy driving period to the display driving period, the dummy driving is performed by recursively using the display data, in such a manner that a driving state of the signal electrodes may correspond to the state of the time when the driving in the non-display driving period is stopped, and thus, the operation is good in terms of continuity of display occurring when the display driving is resumed.

The gate driving circuit 30 gives the gate driver IC 6 a command which indicates the stop of driving of a selection level of the scan electrodes GL1 to GLmk corresponding to the gate of the thin film transistor Tr during the period of T3 to T7 which is the non-display driving period and the dummy driving period, according to the display state control circuit 402.

According to the liquid crystal display driver 10, it is possible to obtain the following advantages.

Although a change state of the load current illustrated in FIG. 3 is schematic, immediately after the load current is transitioned from the longest display driving period to the non-display driving period, or immediately after the load current is transitioned from the shortest non-display driving period to the dummy driving period, a state where the panel load current greatly changes is exemplarily illustrated. During the dummy driving period, in a state (non-selection of the gate of the thin film transistor Tr) where driving of the selection level of the scan electrodes GL1 to GLmk is stopped, the output of the source driving circuit 20 changes in synchronization with the dummy line cycle. If the signal electrodes SL1 to SLj are driven immediately after the non-display driving period, the driving starts from the driving stop state and thereby the load current is greatly changed, but at this time the scan electrodes GL1 to GLmk are not selected, the voltage generated by the change is not transferred to the pixel electrodes, and when return to the display driving period (T7) is performed, the great change of the load current is settled. In this way, it is possible to prevent an unnecessary brightness difference from occurring in the display lines adjacent to a boundary in which return to the display from the non-display is performed at the time of display start of the time T7. As a result, the display data already displayed immediately before the non-display driving period is recursively used as the dummy display data by two display lines, and thereby the signal electrodes SL1 to SLj are driven and then, return to the display operation is performed, and thus, it is possible to reduce the change peak of the load current of the first display line returned from the display driving stopped for a long time, and to suppress the brightness difference from occurring in the liquid crystal display panel 2 which alternately performs the display driving and the non-display driving.

The function of suppressing the generation of the brightness difference can be realized by adding a calculation function 421 which recursively reads the display data already displayed within one frame, and a count function 47 of the dummy line, to the count value RAMCNT of the display read address counter 420 of the display RAM 41, and by adding a control function which recursively reads the display data to the display state control circuit 402, and such a function can be easily realized by adding a relatively simple configuration to the liquid crystal display driver which does not have such a function. It is almost unnecessary to change a basic configuration of an address generation logic according to the display address counter, the display read address counter or the like which already exist.

Since the signal electrodes are driven by other display data of the number of the plurality of display lines by the number of the plurality of display lines, it is easy to gradually change the load current of the display panel over a plurality of times in a process performed until return to the display from the display driving stop, and it is possible to further reduce the change peak of the load current of the display panel of the first line that returns to the display from the display driving stop. Particularly, since the display data at the time of the driving stop and the display data before the driving stop are recursively read and used for the dummy data, immediately before switching is performed from the dummy driving period to the display driving period, a driving state of the signal electrodes corresponds to a state at the time of the driving stop during the non-display driving period, and accordingly, it is preferable in view of a display continuity occurring when the display driving resumes.

It is possible to variably define the preset values of the cycle counters 400 and 410, that is, the display line cycle and the dummy display line cycle using the register setting with respect to the register circuit 60. In addition, even during each driving period of the display, the non-display, and the dummy, the variable defining can be performed by the register setting with respect to the register circuit 60. Thus, it is possible to flexibly correspond to various display forms with respect to the liquid crystal display panel 2.

The present invention is not intended to be limited to the above-described embodiments, and it is needless to say that various modifications can be made without departing from the gist of the present invention.

The number of dummy lines generated by the dummy line counter 411 can be arbitrarily determined by panel characteristic and a method of the display driver. The address value of the display read address counter 420 and the address of the display RAM 41 are not required to coincide with each other, and if necessary, may be converted by an address conversion circuit and then, may access the display RAM 41. The value of the dummy line counter 411 and the value of the display read address RAMCNT actually rewound are not necessarily required to coincide with each other, and may be converted if necessary.

When the output of the source driving circuit 20 is performed during the dummy driving period, the scan electrodes GL1 to GLmk are in a non-selection state (non-selection state of the gate of the thin film transistor Tr), but if necessary, the scan electrodes GL1 to GLmk may also be rewound and selected in the same manner as in the display read address. That is, the output of the dummy driving may be applied to the pixels or may not be applied to the pixels. The display line already displayed maintains electric charges according to display brightness in the pixel capacitor Cpx, and accordingly, although the output of the dummy driving is applied to the related pixel, it is difficult that a great change of the load current occur. As compared with a case where the previous display line in which the display is stopped is driven by new display data, the change of the load current is small. In this regard, the change of the load current occurring immediately after T6 in the dummy driving period in FIG. 3 is illustrated smaller than that in the case of FIG. 5.

An insertion start position of the non-display driving and the cycle thereof can be arbitrarily set by the register circuit. For example, each display line cycle of the non-display driving period and the dummy driving period may be adjusted by the register separately from the line cycle of display driving period. The number of operation line and the operation timing of the dummy line counter 411 that is operated in the non-display driving period and the dummy driving period may be changed by a read method or a data transfer method of the display RAM 41. In addition, the source driving output of a portion of lines of the non-display driving period or the dummy driving period is not limited to the display data in which the display address is rewound and displayed already, and may be replaced with a fixed data such as V0 gradation voltage, V127 gradation voltage or V255 gradation voltage, according to the display data. In this case, during the dummy driving period, the scan electrodes GL1 to GLmk are in a non-selection state, and the driving voltage has to be applied to the pixels.

Each of the non-display driving period, the source in the dummy driving period, and the gate driving timing may be adjusted by the register separately from the line cycle of the display driving period.

One frame cycle is not limited to being synchronized to the vertical synchronization signal VSYNC which is supplied from outside, and may be operated by being synchronized to the timing signal generated on the inside of the liquid crystal display driver 10.

The configuration of generating the read address of the dummy data employs the line counter 401, the dummy line counter 411 and the display state control circuit 402, and is not limited to a configuration of generating the read address of the dummy data by subtracting the count value of the dummy line counter 411 from the count value of the display read address counter 420 which is stopped. The display read address counter is preset to an address value which is smaller by an amount of the plurality of address values than the count value at the time of stop, and from there the display address for the dummy driving may be generated.

In the above-described embodiments, the display line cycle for the non-display driving period and the dummy driving period is equal to the sum of the dummy display line cycle TS_PRD for the non-display driving period and the cycle of the integer multiple of the dummy display line cycle RTN for the dummy driving period, and the preset value of the display line cycle and the preset value of the dummy line are set to the same value RTN as each other. In this way, the consistency of the mutual preset values is maintained, and it is possible to easily perform the setting of the preset value, but the present invention is not limited to this and can be appropriately modified. As described above, it is also possible for the preset value of the display line cycle and the preset value of the dummy line to be different from each other. Parameters which can be defined by the register circuit 60 are not limited to those of the above-described embodiments.

In addition, as explained by FIG. 2, the driver IC is not limited to the configuration to include the liquid crystal display driver LCDDRV, the touch panel controller TPC, and the sub processor SMCU. The driver IC may be configured only by the liquid crystal display driver LCDDRV, or only by the liquid crystal display driver LCDDRV and the touch panel controller TPC. The driver IC may further include the gate driver 6.

What is claimed is:

1. A driver IC that performs a display by driving a plurality of signal electrodes for each display line of a display panel comprising:
    a driving circuit that drives the signal electrodes; and
    a driving control circuit that controls the driving circuit by dividing one display frame period into a plurality of display driving periods, in which non-display driving periods each follow the display driving period, and dummy driving periods each of which follows the non-display driving period and is prefixed to a next display driving period, wherein the plurality of display driving periods, at least one non-display driving period, and at least one dummy driving period is included between a back porch and a front porch in one display frame period, wherein each said display driving period is one period during which the driving control circuit serially selects a plurality of display lines,
    wherein the driving control circuit selects the display line and causes the driving circuit to drive the plurality of signal electrodes using corresponding display data for each display line selected, during the display driving period,
    wherein the driving control circuit does not select the display line and causes the driving circuit to stop a driving of the signal electrodes, during the non-display driving period,
    wherein the driving control circuit causes the driving circuit to start the driving of the signal electrodes using dummy data changed from the display data at a time of a driving stop of the non-display driving period, during the dummy driving period,
    wherein the driving control circuit includes, a display RAM that stores the display data, an address generation circuit that generates a read address of the display RAM, and an address control circuit that controls generation of the read address performed by the address generation circuit,
    wherein the address control circuit includes, a line counter that counts up a line count clock by a display frame unit for each display line cycle designated; a dummy line counter that counts down a dummy line count clock from an initial value for each dummy line cycle designated; and a state control circuit that controls states of the display driving period, the non-display driving period, and the dummy driving period according to a count value of the line counter,
    wherein the address generation circuit includes a display read address counter that counts up the line count clock,
    wherein the state control circuit, causes the read address to be generated by counting up the display read address counter during the display driving period, stops a count operation of the display read address counter in a case that transition from the display driving period to the non-display driving period is performed, causes a count operation of the dummy line counter to be performed during a stop of the count operation of the display read address counter, and causes a read address of dummy data to be performed by subtracting the count value from a count value of the display read address counter which is stopped, and
    wherein the address control circuit performs, a control that updates the read address during the display driving period in synchronization with a display line cycle which is a switching cycle of the display line, and a control that retroactively reads a read address updated during an end of the display driving period and another read address retroactively applied on a basis of the read address, and updates the read addresses as a read address in the dummy driving period.

2. The driver IC according to claim 1,
    wherein the address generation circuit further includes, a subtraction circuit that subtracts a down count value obtained by counting down the dummy line count clock from the initial value during the stop of the count operation of the display read address counter, from the count value of the display read address counter which is updated during the end of the display driving period, and an address selector that selects the count value of the display read address counter during the display driving period, and selects an output of the subtraction circuit during the dummy driving period and sets a read output as the read address.

3. The driver IC according to claim 2, further comprising:
    a display line cycle counter that generates the line count clock for each cycle according to a preset value;
    a dummy line cycle counter that generates the dummy line count clock for each cycle according to the preset value;
    a first cycle selector that selects a first preset value which designates the display line cycle for the display driving period, or a second preset value which designates the display line cycle for the non-display driving period and the dummy driving period, as the preset value of the display line cycle counter; and
    a second cycle selector that selects a third preset value which designates a dummy display line cycle for the dummy driving period, or a fourth preset value which designates the dummy display line cycle for the non-display driving period as the preset value of the dummy display line cycle counter.

4. The driver IC according to claim 3, wherein
    the state control circuit performs a selection control of the first cycle selector and the second cycle selector.

5. The driver IC according to claim 4, wherein
the display line cycle for the non-display driving period and the dummy driving period is equal to a sum of the dummy display line cycle for the non-display driving period and a cycle of an integer multiple of the dummy display line cycle for the dummy driving period, and
the first preset value and the third preset value are a same value.

6. The driver IC according to claim 5, further comprising:
a register circuit that rewritably sets control data for determining the first preset value to the fourth preset value.

7. The driver IC according to claim 1, further comprising:
a register circuit that rewritably sets control data for designating the display driving period, the non-display driving period, and the dummy driving period using the count value of the line counter.

8. A driver IC comprising:
a display driver that performs a display by driving a plurality of signal electrodes for each display line of a display panel; and
a touch panel controller which can perform a touch detection by driving the touch panel during a non-display driving period performed by the display driver, wherein
the display driver includes
a driving circuit that drives the signal electrodes; and
a driving control circuit that controls the driving circuit by dividing one display frame period into a plurality of display driving periods, at least one non-display driving period, and at least one dummy driving period, each said non-display driving period following the display driving period, and each said dummy driving period following the non-display driving period and being prefixed to a next display driving period, the plurality of display driving periods, at least one non-display driving period, and at least one dummy driving period being included between a back porch and a front porch in one display frame period, wherein each said display driving period is one period during which the driving control circuit serially selects a plurality of display lines,
the driving control circuit selects the display line and causes the driving circuit to drive the plurality of signal electrodes using corresponding display data for each display line selected, during the display driving period,
the driving control circuit does not select the display line and causes the driving circuit to stop a driving of the signal electrodes, during the non-display driving period,
the driving control circuit causes the driving circuit to start the driving of the signal electrodes using dummy data changed from the display data at a time of a driving stop of the non-display driving period, during the dummy driving period,
the driving control circuit includes, a display RAM that stores the display data, an address generation circuit that generates a read address of the display RAM, and an address control circuit that controls generation of the read address performed by the address generation circuit,
the address control circuit includes, a line counter that counts up a line count clock by a display frame unit for each display line cycle designated; a dummy line counter that counts down a dummy line count clock from an initial value for each dummy line cycle designated; and a state control circuit that controls states of the display driving period, the non-display driving period, and the dummy driving period according to a count value of the line counter,
the address generation circuit includes a display read address counter that counts up the line count clock, and
the state control circuit, causes the read address to be generated by counting up the display read address counter to count up during the display driving period, stops a count operation of the display read address counter in a case that transition from the display driving period to the non-display driving period is performed, causes a count operation of the dummy line counter to be performed during a stop of the count operation of the display read address counter, and causes a read address of dummy data to be performed by subtracting the count value from a count value of the display read address counter which is stooped.

9. The driver IC according to claim 8, wherein
the state control circuit determines the display driving period, the non-display driving period, and the dummy driving period by comparing the count value of the line counter with reference data.

10. The driver IC according to claim 9, further comprising:
a register circuit that rewritably sets the reference data for determining the display driving period, the non-display driving period, and the dummy driving period.

11. The driver IC according to claim 8, wherein
the address generation circuit further includes, a subtraction circuit that subtracts a down count value obtained by counting down the dummy line count clock from the initial value during the stop of the count operation of the display read address counter, from the count value of the display read address counter which is updated during the end of the display driving period; and an address selector that selects the count value of the display read address counter during the display driving period, and selects an output of the subtraction circuit during the dummy driving period and sets a read output as the read address.

12. The driver IC according to claim 11, further comprising:
a display line cycle counter that generates the line count clock for each cycle according to a preset value;
a dummy line cycle counter that generates the dummy line count clock for each cycle according to the preset value;
a first cycle selector that selects a first preset value which designates the display line cycle for the display driving period, or a second preset value which designates the display line cycle for the non-display driving period and the dummy driving period, as the preset value of the display line cycle counter; and
a second cycle selector that selects a third preset value which designates a dummy display line cycle for the dummy driving period, or a fourth preset value which designates the dummy display line cycle for the non-display driving period as the preset value of the dummy display line cycle counter, wherein
the state control circuit performs a selection control of the first cycle selector and the second cycle selector.

13. The driver IC according to claim 12, wherein
the display line cycle for the non-display driving period and the dummy driving period is equal to a sum of the dummy display line cycle for the non-display driving period and a cycle of an integer multiple of the dummy display line cycle for the dummy driving period, and
the first preset value and the third preset value are set to a same value.

* * * * *